United States Patent
Van Phan et al.

(10) Patent No.: US 10,314,102 B2
(45) Date of Patent: Jun. 4, 2019

(54) DEVICE-TO-DEVICE TRANSMISSIONS

(71) Applicant: Nokia Solutions and Networks Oy, Espoo (FI)

(72) Inventors: Vinh Van Phan, Oulu (FI); Ling Yu, Kauniainen (FI); Kari Veikko Horneman, Oulu (FI); Zexian Li, Espoo (FI)

(73) Assignee: Nokia Solutions and Networks Oy, Espoo (FI)

( * ) Notice: Subject to any disclaimer, the term of this patent is extended or adjusted under 35 U.S.C. 154(b) by 66 days.

(21) Appl. No.: 15/308,141

(22) PCT Filed: May 9, 2014

(86) PCT No.: PCT/EP2014/059547
§ 371 (c)(1),
(2) Date: Nov. 1, 2016

(87) PCT Pub. No.: WO2015/169389
PCT Pub. Date: Nov. 12, 2015

(65) Prior Publication Data
US 2017/0055311 A1    Feb. 23, 2017

(51) Int. Cl.
*H04W 4/00* (2018.01)
*H04W 76/23* (2018.01)
*H04W 72/04* (2009.01)

(52) U.S. Cl.
CPC .......... *H04W 76/23* (2018.02); *H04W 72/04* (2013.01)

(58) Field of Classification Search
CPC . H04W 76/023; H04W 48/10; H04W 72/048; H04W 76/043; H04W 48/18; H04W 36/02; H04W 72/08; H04W 72/02
(Continued)

(56) References Cited

U.S. PATENT DOCUMENTS 9,002,281 B2 * 4/2015 Fwu ................ H04W 72/02
                                                            455/63.1
9,088,989 B2 * 7/2015 Smith ............ H04W 72/0493
(Continued)

FOREIGN PATENT DOCUMENTS

WO   WO 2012/052052 A1   4/2012
WO   WO 2013/098461 A1   7/2013
WO   WO 2014/047905 A1   4/2014

OTHER PUBLICATIONS

Catt; "LTE network manage and continuously control for D20"; R2-141198; 3GPP TSG-RAN WG2 Meeting #85bis; Valencia, Spain; Mar. 31-Apr. 4, 2014; whole document (4 pages).
(Continued)

*Primary Examiner* — Hanh N Nguyen
(74) *Attorney, Agent, or Firm* — Harrington & Smith

(57) ABSTRACT

A method, including receiving at a first communication device from a first network information for assisting device-to-device transmissions between a group of communication devices including said first communication device; thereafter detecting at said first communication device loss of possibility to continue receiving assistance for said device-to-device transmissions from said first network; and deciding at said first communication device whether to continue with said device-to-device transmissions with assistance from a second network or without assistance from a second network.

18 Claims, 4 Drawing Sheets

(58) Field of Classification Search
USPC .................................................. 370/350, 329
See application file for complete search history.

(56) References Cited

U.S. PATENT DOCUMENTS

| 9,674,682 B2* | 6/2017 | Miskiewicz | ............ H04W 4/90 |
| 9,894,569 B2* | 2/2018 | Lee | ........................ H04W 76/27 |
| 9,924,432 B2* | 3/2018 | Fwu | ........................ H04W 28/24 |
| 2013/0308598 A1 | 11/2013 | Madan et al. | ................ 370/331 |

OTHER PUBLICATIONS

LG Electronics Inc; "D2D radio resource usage upon mobility"; R2-134372; 3GPP TSG-RAN WG2 Meeting #84; San Francisco, USA; Nov. 11-15, 2013; whole document (3 pages).
Sony; "D2D Resource Allocation Mode Selection"; R2-141300; 3GPP TSG-RAN WG2 Meeting #85bis; Valencia, Spain; Mar. 31-Apr. 4, 2014; whole document (4 pages).

* cited by examiner

DEVICE-TO-DEVICE TRANSMISSIONS

BACKGROUND

Some communications between communication devices are device-to-device transmissions, in which one communication device receives a transmission directly from another communication device, i.e. other than via one or more intermediate nodes such as fixed transceivers of a network.

Device-to-device transmissions may be broadcast, groupcast or multi-cast and unicast transmissions.

Device-to-device transmissions may be used, for example, for the effective distribution of public safety information.

Device-to-device transmissions may comprise (a) network-controlled transmissions in which a network decides which radio resources of a pool of resources are to be used for a device-to-device transmission; or (b) more autonomous transmissions in which the transmitting communication device itself decides which radio resources of a pool of resources to use for a device-to-device transmission.

BRIEF SUMMARY

The inventors for the present application have identified the challenge of achieving good service continuity, robustness and performance of device-to-device communications in the event of an unplanned loss of assistance from a network for the device-to-device communications.

There is hereby provided a method, comprising: receiving at a first communication device from a first network information for assisting device-to-device transmissions between a group of communication devices including said first communication device; thereafter detecting at said first communication device loss of possibility to continue receiving assistance for said device-to-device transmissions from said first network; and deciding at said first communication device whether to continue with said device-to-device transmissions with assistance from a second network or without assistance from a second network. In one embodiment, the method further comprises: receiving at said first communication device from said second network information facilitating said deciding at the first communication device.

In one embodiment, the method further comprises: transmitting information about the result of said deciding from the first communication device to the second network.

In one embodiment, the method further comprises: transmitting from said first communication device to one or more other of said group of communication devices information about continuing with said device-to-device transmissions with assistance from said second network.

In one embodiment, the information about continuing with said device-to-device transmissions with assistance from said second network comprises one or more of: an indication of detecting the second network at the first communication device; information about the capability of the second network to assist said device-to-device transmissions; information from the second network about its preference or recommendation for how to further continue with said device-to-device transmissions; and a result of a decision at said first communication device about need for assistance from said second network for said device-to-device transmissions.

In one embodiment, said deciding is performed together with one or more other communication devices of said group of communication devices.

In one embodiment, the method further comprises: deciding to continue with said device-to-device transmissions with assistance from said second network; and transmitting to the second network information about a provisional selection of resources for a resource pool for said device-to-device transmissions; and receiving at said first communication device from said second network an indication to proceed with use of said provisional selection of resources for said device-to-device communications or an indication of a different selection of resources for said device-to-device transmissions.

There is also provided a method, comprising: deciding at a network whether or not to keep a first communication device in a connected state solely for the purpose of providing assistance from the network for the continuation of device-to-device transmissions between a group of communication devices including said first communication device. In one embodiment, the method further comprises deciding to keep said first communication device in a connected state, and transmitting from said network to said first communication device information about resources and/or scheduling for said device-to-device transmissions.

In one embodiment, the method further comprises deciding not to keep said first communication device in a connected state, and transmitting an indication for said first communication device to continue autonomously with said device-to-device transmissions in a state unconnected to the network.

In one embodiment, said device-to-device transmissions were previously conducted with the assistance of another network.

In one embodiment, said device-to-device transmissions provide public safety information.

In one embodiment, said first network or said another network is a network dedicated to the distribution of public safety information, and said second network is not dedicated to the distribution of public safety information.

There is also provided an apparatus configured to perform any method described above.

There is also provided an apparatus comprising: a processor and memory including computer program code, wherein the memory and computer program code are configured to, with the processor, cause the apparatus to: receive at a first communication device from a first network information for assisting device-to-device transmissions between a group of communication devices including said first communication device; and thereafter detecting at said first communication device loss of possibility to continue receiving assistance for said device-to-device transmissions from said first network, decide at said first communication device whether to continue with said device-to-device transmissions with assistance from a second network or without assistance from a second network.

In one embodiment, the memory and computer program code are further configured to, with the processor, cause the apparatus to: receive at said first communication device from said second network information facilitating said deciding at the first communication device. In one embodiment, the memory and computer program code are further configured to, with the processor, cause the apparatus to: transmit information about the result of said deciding from the first communication device to the second network.

In one embodiment, the memory and computer program code are further configured to, with the processor, cause the apparatus to: transmit from said first communication device to one or more other of said group of communication devices information about continuing with said device-to-device transmissions with assistance from said second network.

In one embodiment, the information about continuing with said device-to-device transmissions with assistance from said second network comprises one or more of: an indication of detecting the second network at the first communication device; information about the capability of the second network to assist said device-to-device transmissions; information from the second network about its preference or recommendation for how to further continue with said device-to-device transmissions; and a result of a decision at said first communication device about need for assistance from said second network for said device-to-device transmissions.

In one embodiment, the memory and computer program code are further configured to, with the processor, cause the apparatus to: decide at said first communication device together with one or more other communication devices of said group of communication devices whether to continue with said device-to-device transmissions with assistance from a second network or without assistance from a second network.

In one embodiment, the memory and computer program code are further configured to, with the processor, cause the apparatus to: upon deciding to continue with said device-to-device transmissions with assistance from said second network, transmit to the second network information about a provisional selection of resources for a resource pool for said device-to-device transmissions; and receive at said first communication device from said second network an indication to proceed with use of said provisional selection of resources for said device-to-device communications or an indication of a different selection of resources for said device-to-device transmissions.

There is also provided an apparatus comprising: a processor and memory including computer program code, wherein the memory and computer program code are configured to, with the processor, cause the apparatus to: decide at a network whether or not to keep a first communication device in a connected state solely for the purpose of providing assistance from the network for the continuation of device-to-device transmissions between a group of communication devices including said first communication device.

In one embodiment, the memory and computer program code are further configured to, with the processor, cause the apparatus to: upon deciding to keep said first communication device in a connected state, transmit from said network to said first communication device information about resources and/or scheduling for said device-to-device transmissions.

In one embodiment, the memory and computer program code are further configured to, with the processor, cause the apparatus to: upon deciding not to keep said first communication device in a connected state, transmit an indication for said first communication device to continue autonomously with said device-to-device transmissions in a state unconnected to the network.

In one embodiment, said device-to-device transmissions were previously conducted with the assistance of another network.

In one embodiment, said device-to-device transmissions provide public safety information.

In one embodiment, said first network or said another network is a network dedicated to the distribution of public safety information, and said second network is not dedicated to the distribution of public safety information.

There is also provided a computer program product comprising program code means which when loaded into a computer controls the computer to: receive at a first communication device from a first network information for assisting device-to-device transmissions between a group of communication devices including said first communication device; and thereafter detecting at said first communication device loss of possibility to continue receiving assistance for said device-to-device transmissions from said first network, decide at said first communication device whether to continue with said device-to-device transmissions with assistance from a second network or without assistance from a second network.

There is also provided a computer program product comprising program code means which when loaded into a computer controls the computer to: decide at a network whether or not to keep a first communication device in a connected state solely for the purpose of providing assistance from the network for the continuation of device-to-device transmissions between a group of communication devices including said first communication device.

BRIEF DESCRIPTION OF THE DRAWINGS

Embodiments of the present invention are described in detail hereunder, by way of example only, with reference to the accompanying drawings, in which.

DETAILED DESCRIPTION

Figure 1:
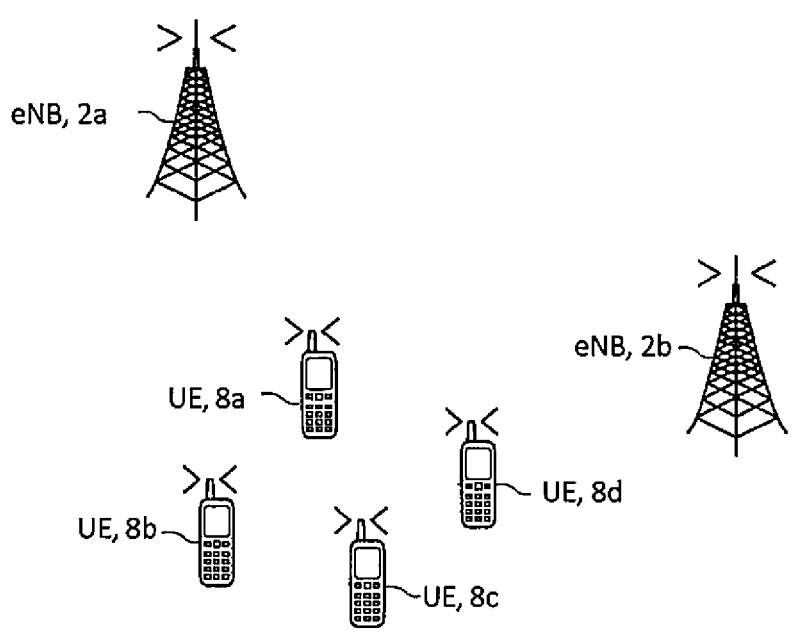
FIG. 1 illustrates an example of a group of communication devices making device-to-device transmissions with assistance from a first network via an access node of the first network, and in the coverage area of an access node of a second network.

FIG. 1 illustrates an example of a group of communication devices (UE) 8 communicating with each other by device-to-device (D2D) transmissions under the assistance of a first network via an eNB 2a of the first network. The following detailed description describes examples of techniques to adopt in the event that the first network becomes unable to continue to provide assistance for the device-to-device transmissions (e.g. because of a failure of the assisting network or because one or more of the group of UEs 8 happen to move out of the coverage area of the assisting network).

FIG. 1 only shows one access node 2 for each of the two networks, but each of the networks may comprise a large number of access nodes. In this example, the access node 2a is part of a network dedicated to the assistance of D2D communications for e.g. distributing public safety information. In this example, the access node 2b is part of a commercial network whose primary service is the transfer of data (such as multimedia data) between the network and communication devices (UEs).

Figure 2:
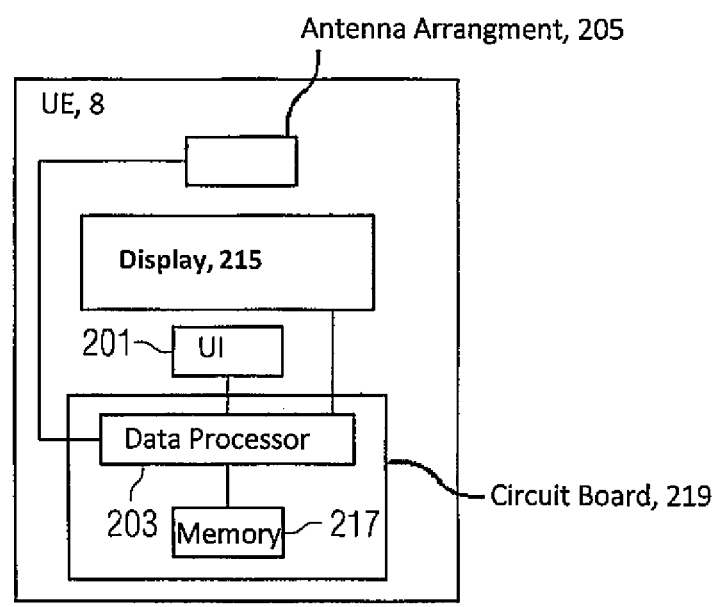
FIG. 2 illustrates an example of apparatus for use at user equipment in FIG. 1.

FIG. 2 shows a schematic view of an example of user equipment 8 that may be used for communicating with the eNBs 2 or other UEs 8 of FIG. 1 via a wireless interface. In addition to D2D communications, the user equipment (UE)

8 may be used for various tasks such as making and receiving phone calls, for receiving and sending data from and to a data network and for experiencing, for example, multimedia or other content. The UE 8 may be any device capable of at least sending or receiving radio signals to or from the UEs and eNBs 2 of FIG. 1. Non-limiting examples include a mobile station (MS), a portable computer provided with a wireless interface card or other wireless interface facility, personal data assistant (FDA) provided with wireless communication capabilities, or any combinations of these or the like. The UE 8 may communicate via an appropriate radio interface arrangement of the UE 8. The interface arrangement may be provided for example by means of a radio part and associated antenna arrangement 205. The antenna arrangement may be arranged internally or externally to the UE 8, and may include a plurality of antennas capable of operating in a multi-layer transmission scheme.

The UE 8 may be provided with at least one data processing entity 203 and at least one memory or data storage entity 217 for use in tasks it is designed to perform. The data processor 203 and memory 217 may be provided on an appropriate circuit board 219 and/or in chipsets.

The user may control the operation of the UE 8 by means of a suitable user interface (UI) such as key pad 201, voice commands, touch sensitive screen or pad, combinations thereof or the like. A display 215, a speaker and a microphone may also be provided. Furthermore, the UE 8 may comprise appropriate connectors (either wired or wireless) to other devices and/or for connecting external accessories, for example hands-free equipment, thereto.

Figure 3:
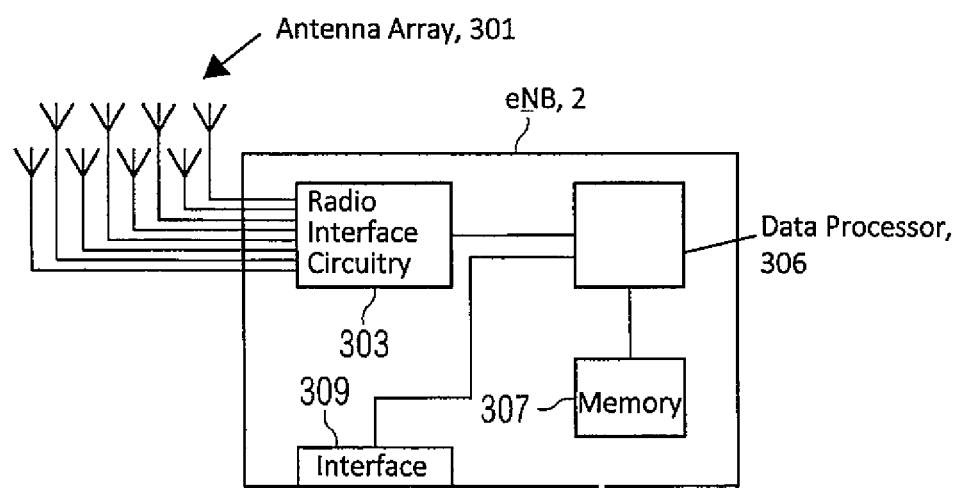
FIG. 3 illustrates an example of apparatus for use at a network transceiving entity e.g. eNodeB in FIG. 1.

FIG. 3 shows an example of apparatus for use at the network transceiving entities 2 of FIG. 1 The apparatus comprises a radio frequency antenna array 301 configured to receive and transmit radio frequency signals; radio frequency interface circuitry 303 configured to interface the radio frequency signals received and transmitted by the 8-antenna array 301 and the data processor 306. The radio frequency interface circuitry 303 may also be known as a transceiver. The apparatus also comprises an interface 309 via which it can send and receive information to and from one or more other network nodes. The data processor 306 is configured to process signals from the radio frequency interface circuitry 303, control the radio frequency interface circuitry 303 to generate suitable RF signals to communicate information to the UE 8 via the wireless communications link, and also to exchange information with other network nodes via the interface 309. The memory 307 is used for storing data, parameters and instructions for use by the data processor 306.

It would be appreciated that the apparatus shown in each of FIGS. 2 and 3 described above may comprise further elements which are not directly involved with the embodiments of the invention described hereafter. As mentioned above, this embodiment relates to the example situation in which a UE 8a has been making D2D communications with one or more other UEs 8b, 8c, 8d in a D2D group with the assistance of resource allocation (RA) information and/or scheduling information received from a public safety (PS) network via a radio transceiver 2a of that network (STEP 402 of FIG. 4), but then happens to find itself unable to continue receiving such assistance from the PS network because of a failure of the PS network or because of a movement of the group of UEs 8 to outside the coverage of the PS network (STEP 404 of FIG. 4). The UE 8 has already detected or subsequently detects the existence of a commercial radio access network (RAN), and more particularly detects transmissions from a radio transceiving entity (e.g. eNodeB (eNB)) 2b of the commercial RAN.

In one embodiment of the present invention, UE 8a makes one or more transmissions to eNB 2b including information about the ongoing D2D group communication session. Other UEs 8 in the group may also make such transmissions to the eNB 2b, and the commercial network can thereby build up information about the D2D session, such as: information about which UE is the first member and which one or more UEs are n-th members of the D2D session. This enables the commercial RAN to respond to any transmission from a UE of the group with information about whether the session is already under assistance of the commercial RAN, and if so, to what extent.

The UE 8a receives from the commercial RAN via eNB 2b information that facilitates a decision at the UE 8a about whether it needs assistance from the commercial network for continuing with the D2D communications. UE 8a makes a decision about whether to continue with the D2D communications with the assistance of the commercial RAN or without the assistance of the commercial RAN (STEP 406 of FIG. 4); and UE 8a transmits the result of the decision to the eNB 2b of the commercial RAN serving UE 8a. As mentioned above, one or more of the other UEs of the group may also provide information about the D2D group to the commercial network in parallel or simultaneously. Based on the UE capability information and priority information provided by each UE, the commercial network may configure more than one UE to be the first UE of the same active D2D user group (wherein a first UE is a UE that conducts the ongoing D2D group communication).

The UE (in this example, UE 8a) that is configured by the commercial network as the first UE of the active D2D user group may proceed as follows. After losing assistance from the PS network, the group of UEs initially continue with the D2D communications on an autonomous basis (Mode 2—discussed in more detail below) using the resource pool allocated by the PS network before assistance was lost. After receiving information from the commercial network about receiving assistance for continuing with the D2D communications from the commercial network, the first UE 8a decides whether to continue with the D2D communications on an autonomous basis or to continue with the ongoing D2D session with assistance from the commercial network. For example, the decision may be based on one or more of access need, and capability and condition of the first UE 8a and the commercial network.

First UE 8a may or may not need to access the commercial network. Access may be required, for example, when the first UE 8a also needs to communicate with e.g. command centre or remote members of the user group or due to some predefined roaming configurations between the first UE 8a and the commercial network.

The first UE 8a may broadcast to other UEs 8 in the D2D group information including one or more of: an indication of the detection of the commercial network by first UE 8a; D2D assisting capability, preference or recommendation of the commercial network; the result of the decision at UE 8a about need for assistance for continuance of the D2D communications from the commercial network (e.g. the result of the decision whether or not to maintain a connected state with the commercial network, and if so which D2D operation mode to use). One or more of the other UEs 8 in the D2D group may at this stage still be outside of network coverage of the commercial network (as well as the PS network), and broadcasting this information enables one or more other UEs in the group to make a decision not to perform (or to delay) an initial roaming procedure with the commercial RAN until the current D2D session ends or until some further indication to do so from one or more other D2D group member(s) such as the first UE 8a.

Figure 5:
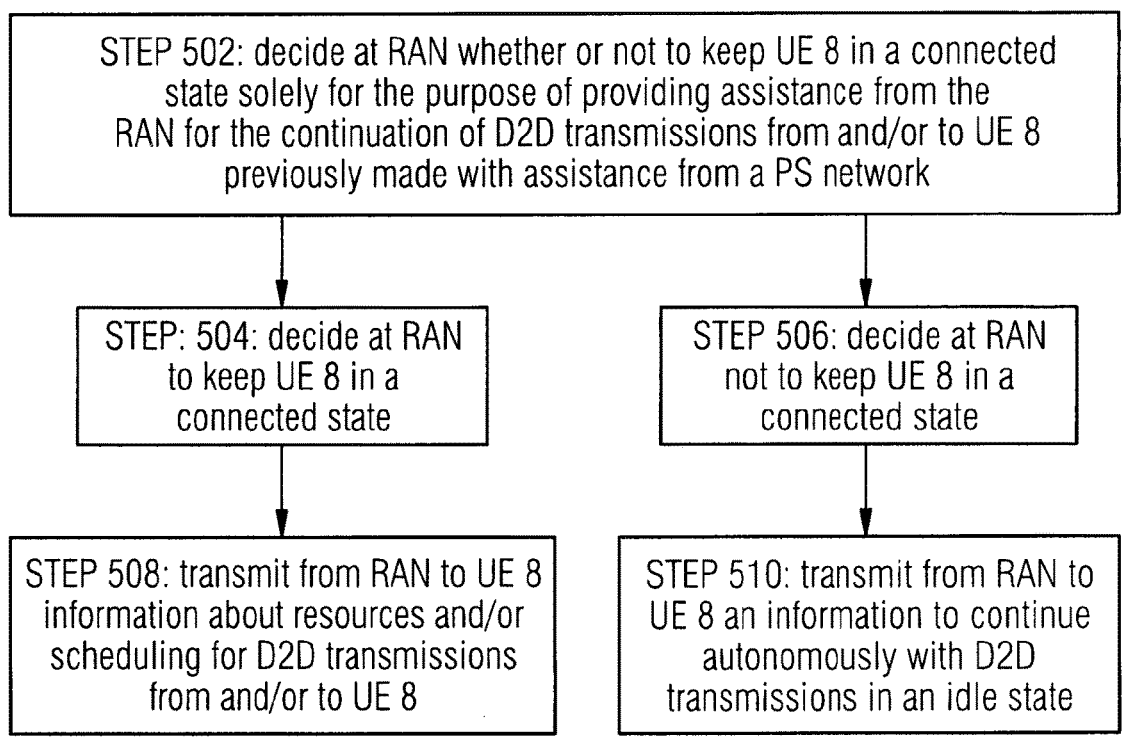
FIG. 5 illustrates operations at one or more radio access network entities in accordance with one embodiment of the present invention.

In one embodiment, the commercial RAN may determine whether to keep first UE 8a in connected state solely for the purpose of assisting the first UE 8a with the ongoing D2D communications (STEP 502 of FIG. 5). For example, the commercial RAN may decide to reconfigure and schedule first UE 8a with new resources (STEPS 504 and 508 of FIG. 5) for the D2D communications, or the commercial RAN may decide to indicate to first UE 8a to return to an idle state (in relation to the commercial RAN) and continue with the D2D communications autonomously (STEPS 506 and 510 of FIG. 5). In one embodiment, the decision about whether to receive assistance from the commercial RAN for the ongoing D2D communications may be performed individually by first UE 8a alone, or collectively by one or more or all of the UEs in the D2D group.

Figure 4:
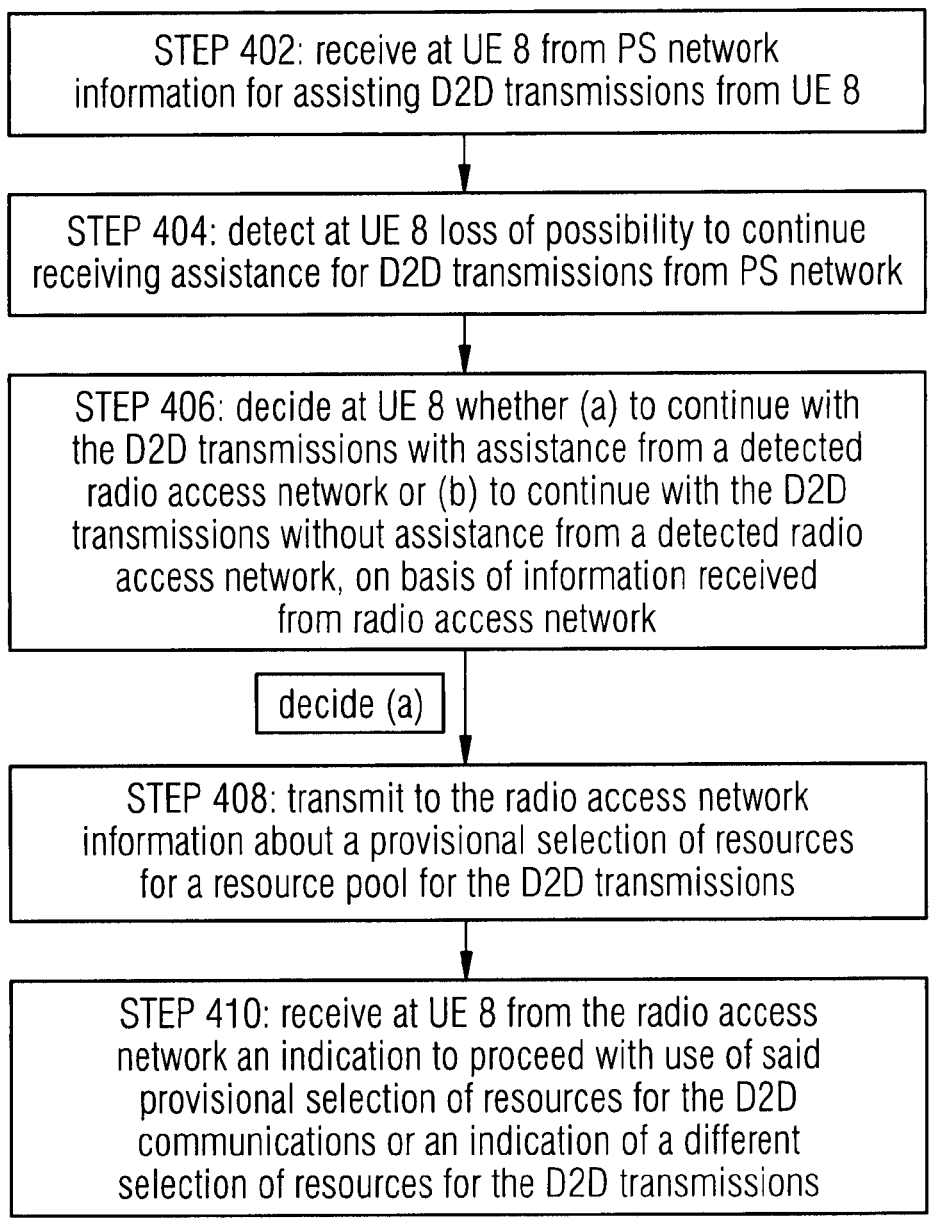
FIG. 4 illustrates operations at a communication device in accordance with one embodiment of the present invention.

If the decision at UE 8a is to receive assistance for the ongoing D2D communications from the commercial RAN, then first UE 8a may send a RA request to the serving eNB 2b of the commercial network with adapted contents (identifying the PS out-of-coverage resource pool and an initial selection of resources from a preconfigured PS-specific pool for autonomous D2D—Mode 2—if needed, as the commercial RAN may have no control over the Mode 2 pool) (STEP 408 of FIG. 4).

The commercial RAN may respond via serving eNB 2b with confirmation to use the selection of resources indicated in the RA request for the ongoing D2D communications, or the commercial RAN may specify a sub-set of the resources indicated in the RA request, or the commercial RAN may instruct the first UE 8a to keep operating in Mode 2 but in coverage of the commercial RAN.

Since first UE 8a is not a trusted entity in general, an explicit identification of Mode 2 pool resources in the RA request from first UE 8a may be optional, or the inclusion of a Pool ID recognisable to the commercial RAN may be sufficient. The serving eNB 2b may then obtain get details of the resource pool from another entity of the commercial RAN (together with authentication/authorization of first UE 8a).

In the event that loss of D2D assistance from the PS network is accompanied by a move to within the coverage of a commercial RAN employing radio resources that overlap with the preconfigured Mode 2 pool being used by the UE 8a group for D2D communications, first UE 8a may determine whether the current D2D operation in Mode 2 needs to be stopped (in order to avoid potential interference with transmissions controlled by the commercial RAN) and switched to Mode 1 under assistance of the commercial RAN. For this transition, a flexible timer T taking value in a predefined range (0, Tmax) may be applied. First UE 8a may stop operating in Mode 2 right away or continue operating in Mode 2 for up to Tmax depending on the degree of overlap between the Mode 2 resource pool and the radio resources employed by the new, commercial RAN.

More generally, a UE 8a may continue making D2D transmissions using resources allocated to it by semi-persistent scheduling (SPS), until the UE 8a detects loss of cellular synchronization to the serving cell of the PS network from which it received the D2D resource allocation and detects being out of coverage of that PS network. This applies even when no second network might be available to assist with continuation of the D2D communications.

A timer T may be provided with flexible duration, e.g., set up to the maximum Discontinuous Reception (DRX) long cycle or allowable Radio Link Failure (RLF) recovery time, for which the UE 8 may continue to make D2D transmissions according to a previously received resource allocation (also constrained to the remaining channel holding time of the UE 8, if applied). T starts when UE 8 detects an out-of-coverage (e.g., suddenly not able to receive the serving cell of the network from which it received the RA for D2D communications, or not able to receive D2D synchronisation signal directly from any serving cell of the network from which it received the RA for D2D communications).

For the duration of the timer T, UE 8 continues to make D2D transmissions according to the most recently received RA using former timing, and also continues trying to reestablish D2D synchronisation by finding some synchronisation sources. The D2D resources may be allocated out of an exclusive pool and in SPS fashion. Therefore, as long as T is under control (e.g. constrained to the remaining part of the current channel holding time, if configured, or within RLF recovery timer) then the continuation of D2D transmissions by UE according to the most recently received RA may not cause severe interference to transmissions between UEs and the network. Firstly, the network may be down locally at that moment also for such cellular transmissions. Secondly, even if the network may not be down locally at that moment for cellular transmissions, the network may wait until it has detected that RLF recovery of the D2D UE 8 is not possible before reclaiming the resources it had previously allocated to D2D transmissions for UE 8 and starting to reallocate those resources for transmissions between the network and other UEs.

If a D2D synch source can be found within the duration of timer T, D2D UE 8a may stop timer T and decide whether to continue with D2D transmissions according to the most recently received RA based on the following rules:

(i) D2D UE 8a continues making D2D transmissions according to the most recently received RA at least until channel holding time expires, if synchronisaton may be reestablished with the serving cell (directly or via some relaying UE source) or if a new synchronisation source (such as e.g. the second, commercial RAN in the embodiment described above) is found and the resources identified in the most recently received RA are a subset of the resource pool associated with the new synchronisation source. In the former case, the D2D UE 8 may renew the resource request and try to continue using the same resources (i.e. the resources identified in the RA received most recently before loss of the old synchronisation source) even longer. D2D UE 8 may determine the identity of the resource pool associated with the new synchronisation source based on some information indicated by the new synchronisation source, e.g. whether or not it operates within the coverage of the first network (i.e. the network that previously provided the RA according to which the D2D group is making the D2D transmissions) and/or explicit D2D resource pool information received from the new synchronisation source (e.g. commercial RAN 2b in the embodiment described above).

(ii) D2D UE 8 may stop making transmissions according to the most recently received RA and instead start making D2D transmissions using the new available D2D resource pool associated to the new synchronisation source, if the resources identified in the most recently received RA are not a subset of the resource pool associated with the new synchronisation source.

If no new synchronisation source is found before timer T expires, D2D UE 8 may reconfigure itself to operate as a new local synchronisation source. In this situation, D2D UE 8 may or may not adopt the former timing and D2D resource pool depending on the nature of the D2D resource pool (e.g. whether or not it is specific to the former, lost network) and service continuity need, i.e. the need to try to keep using the former D2D resource pool and timing.

The most recently received RA may be used by D2D UE 8 during the whole life time of timer T (i.e. Timer T is not stopped even if D2D UE 8 finds a new synchronisation source, such as the commercial network in the embodiment described above). In other words, only when timer T expires, may D2D UE 8 make a decision about whether or not to continue using the same RA based on the rules described above. In this case, D2D group communication can be continued using the same RA for at least the duration of timer T, and at the same time D2D UE 8 may continue to try to establish synchronization with another synchronisation source so that D2D service discontinuity can be reduced. For the duration of timer T, D2D UE 8 may broadcast to D2D group members by D2D transmissions an indication of any newly found synchronisation source and other information such as how long the same RA (i.e. the RA most recently received from the first, lost network) will be used.

For UEs receiving D2D transmissions (Rx UE), a similar operation based on a timer T may be introduced when the Rx UE experiences a change of network coverage from in-coverage to out-of-coverage. Rx UE 8 may start the above-mentioned timer T as soon as Rx UE detects that coverage change, and Rx UE may continue receiving D2D transmissions on the currently configured resource pool of Mode 1 (in addition to that of Mode 2) for as long as Rx UE is able to, during which time timer T may be reset and restarted, and Rx UE may also get updated information of the Mode 1 pool in a D2D transmission from a transmitting UE. If Rx UE is not able to receive D2D transmissions on the currently configured pool of Mode 1 during the duration of timer T, then Rx UE may stop monitoring the Mode 1 pool and switch to Mode 2.

In the above-mentioned description, Mode 1 refers to a scheduled mode and Mode 2 refers to a more autonomous mode. In both modes, UEs are provided with a resource pool (pool of time-frequency radio resources) in which they attempt to receive scheduling assignments. In Mode 1, a UE requests transmission resources from a network (e.g. from an eNB of a network), and the network schedules transmission resources for transmission of scheduling assignment(s) and data. In Mode 1, the UE sends a scheduling request (D-SR or RA) to the network followed by a buffer status report (BSR) on the basis of which the network/eNB can determine that the UE intends to make a D2D transmission as well as the amount of resources required for the intended D2D transmission. In Mode 1, the UE needs to be in a RRC (Radio Resource Control)-connected state with the network in order to make a D2D transmission. In Mode 2, UEs are provided with a resource pool (pool of time-frequency radio resources) from which the UEs autonomously select resources for D2D transmissions. In Mode 2, UEs within the coverage of the network may obtain information about the resource pool from the network/eNB (e.g. SIB signalling); UEs outside the coverage of the network may obtain information about the resource pool via D2D transmissions from other UEs within the coverage of the network, or the resource pool may be preconfigured.

The above-described techniques provide solutions to (i) how D2D UEs should handle resource allocation for D2D transmissions when finding themselves suddenly outside the coverage of the network from which they had received the RA for current D2D transmissions, and (ii) how such out-of-coverage D2D UEs should behave when they find another network that may possibly be able to assist with the continuance of D2D transmissions.

The above-described operations may require data processing in the various entities. The data processing may be provided by means of one or more data processors. Similarly various entities described in the above embodiments may be implemented within a single or a plurality of data processing entities and/or data processors. Appropriately adapted computer program code product may be used for implementing the embodiments, when loaded to a computer. The program code product for providing the operation may be stored on and provided by means of a carrier medium such as a carrier disc, card or tape. A possibility is to download the program code product via a data network. Implementation may be provided with appropriate software in a server.

For example the embodiments of the invention may be implemented as a chipset, in other words a series of integrated circuits communicating among each other. The chipset may comprise microprocessors arranged to run code, application specific integrated circuits (ASICs), or programmable digital signal processors for performing the operations described above.

Embodiments of the invention may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, Calif. and Cadence Design, of San Jose, Calif. automatically route conductors and locate components on a semiconductor chip using well established rules of design as well as libraries of pre stored design modules. Once the design for a semiconductor circuit has been completed, the resultant design, in a standardized electronic format (e.g., Opus, GDSII, or the like) may be transmitted to a semiconductor fabrication facility or "fab" for fabrication.

In addition to the modifications explicitly mentioned above, it will be evident to a person skilled in the art that various other modifications of the described embodiment may be made within the scope of the invention.

The invention claimed is:
1. A method, comprising:
performing, at a first communication device, device-to-device transmissions with a second communication device, where a group of communication devices comprises the first communication device and the second communication device;
receiving, at the first communication device from a base station of a first network, resource information for assisting the device-to-device transmissions;
thereafter detecting, at said first communication device, loss of possibility to continue receiving the resource information for assisting said device-to-device transmissions from said first network;
detecting, at said first communication device, there is a second network operating on a carrier overlapping with pre-configured resources for device-to-device transmissions of said first communication device; and
deciding, at said first communication device, to continue with said device-to-device transmissions with either resource assistance from the second network or to use the pre-configured resources without assistance from the second network.

2. A method according to claim further comprising:
receiving, at said first communication device from said second network, information facilitating said deciding at the first communication device.

3. A method according to claim 1, further comprising:
transmitting information about the result of said deciding from the first communication device to the second network.

4. A method according to claim 1, further comprising:
transmitting, from said first communication device to one or more other of said group of communication devices, information about continuing with said device-to-device transmissions with assistance from said second network.

5. A method according to claim 4, wherein the information about continuing with said device-to-device transmissions with assistance from said second network comprises one or more of:
an indication of detecting the second network at the first communication device;
information about the capability of the second network to assist said device-to-device transmissions;
information from the second network about the second network's preference or recommendation for how to further continue with said device-to-device transmissions; and/or
a result of a decision at said first communication device about need for assistance from said second network for said device-to-device transmissions.

6. A method according to claim 1, wherein said deciding is performed together with one or more other communication devices of said group of communication devices.

7. A method according to claim comprising:
deciding to continue with said device-to-device transmissions with assistance from said second network;
transmitting, to the second network, information about a provisional selection of resources for a resource pool for said device-to-device transmissions; and
receiving, at said first communication device from said second network, an indication to proceed with use of said provisional selection of resources for said device-to-device communications or an indication of a different selection of resources for said device-to-device transmissions.

8. A method according to claim 1, wherein said device-to-device transmissions provide public safety information.

9. A method according to claim 1, wherein at least one of:
the first network is a network dedicated to the distribution of public safety information, or
the second network is not dedicated to the distribution of public safety information.

10. A method, comprising:
providing resource information from a first network to a first communication device performing device-to-device transmissions with a second communication device, where a group of communication devices comprises the first communication device and the second communication device;
deciding at the first network whether or not to keep the first communication device in a connected state;
in response to determining that the first communication device is to be kept in the connected state, transmit the resource and/or scheduling information to the first communication device for assisting the continuation of the device-to-device transmissions; and
in response to determining that the first communication device is not to be kept in the connected state, transmit an indication to the first communication device to continue the device-to-device transmissions using pre-configured resources for device-to-device transmissions of said first communication device,
wherein the determining of whether the first communication device is to be kept in the connected state is based at least partially on whether there is a second network operating on a carrier overlapping with the pre-configured resources.

11. A method according to claim 10, wherein said device-to-device transmissions were previously conducted with the assistance of another network.

12. An apparatus comprising:
a processor and non-transitory memory comprising computer program code, wherein the non-transitory memory and computer program code are configured to, when executed with the processor, cause the apparatus to:
perform, at a first communication device, device-to-device transmissions with a second communication device, where a group of communication devices comprises the first communication device and the second communication device;
receive, at the first communication device from a base station of a first network, resource information for assisting the device-to-device transmissions;
thereafter detect, at said first communication device, loss of possibility to continue receiving the resource information for assisting said device-to-device transmissions from said first network;
detect, at said first communication device, there is a second network operating on a carrier overlapping with pre-configured resources for device-to-device transmissions of said first communication device; and
decide, at said first communication device, to continue with said device-to-device transmissions with either resource assistance from the second network or to use pre-configured resources without assistance from the second network.

13. An apparatus according to claim 12, wherein the non-transitory memory and computer program code are further configured to, with the processor, cause the apparatus to:
receive, at said first communication device from said second network, information facilitating said deciding at the first communication device.

14. An apparatus according to claim 12, wherein the non-transitory memory and computer program code are further configured to, with the processor, cause the apparatus to:
transmit information about the result of said deciding from the first communication device to the second network.

15. An apparatus according to claim 12, wherein the non-transitory memory and computer program code are further configured to, with the processor, cause the apparatus to:
transmit, from said first communication device to one or more other of said group of communication devices, information about continuing with said device-to-device transmissions with assistance from said second network.

16. An apparatus according to claim 15, wherein the information about continuing with said device-to-device transmissions with assistance from said second network comprises one or more of:

an indication of detecting the second network at the first communication device;

information about the capability of the second network to assist said device-to-device transmissions;

information from the second network about the second network's preference or recommendation for how to further continue with said device-to-device transmissions; and/or a result of a decision, at said first communication device, about need for assistance from said second network for said device-to-device transmissions.

17. An apparatus comprising:

a processor and non-transitory memory including computer program code, wherein the non-transitory memory and computer program code are configured to, when executed with the processor, cause the apparatus to:

provide resource and/or scheduling information from a first network to a first communication device performing device-to-device transmissions with a second communication device, where a group of communication devices comprises the first communication device and the second communication device;

decide at the first network whether or not to keep the first communication device in a connected state;

in response to a determination that the first communication device is to be kept in the connected state, transmit the resource and/or scheduling information to the first communication device for assisting the continuation of the device-to-device transmissions; and in response to a determination that the first communication device is not to be kept in the connected state, transmit an indication to the first communication device to continue the device-to-device transmissions using pre-configured resources for device-to-device transmissions of said first communication device, wherein the determination of whether the first communication device is to be kept in the connected state is based at least partially on whether there is a second network operating on a carrier overlapping with the pre-configured resources.

18. A non-transitory computer readable memory having computer program code stored thereon, for causing an apparatus to:

perform, at a first communication device, device-to-device transmissions with a second communication device, where a group of communication devices comprises the first communication device and the second communication device;

receive, at the first communication device from a base station of a first network, resource information for assisting the device-to-device transmissions;

thereafter detecting, at said first communication device, loss of possibility to continue receiving the resource information for assisting said device-to-device transmissions from said first network;

detecting, at said first communication device, there is a second network operating on a carrier overlapping with pre-configured resources for device-to-device transmissions of said first communication device; and decide, at said first communication device, to continue with said device-to-device transmissions with either assistance from the second network or to use pre-configured resources without assistance from the second network, wherein the deciding is based at least on whether the second network is detected.

* * * * *

UNITED STATES PATENT AND TRADEMARK OFFICE
CERTIFICATE OF CORRECTION

PATENT NO. : 10,314,102 B2
APPLICATION NO. : 15/308141
DATED : June 4, 2019
INVENTOR(S) : Vinh Van Phan et al.

It is certified that error appears in the above-identified patent and that said Letters Patent is hereby corrected as shown below:

In Claim 2:
Column 11, Line 4, "claim" should be deleted and --claim 1-- should be inserted.

In Claim 7:
Column 11, Line 36, "claim" should be deleted and --claim 1-- should be inserted.

Signed and Sealed this
Sixteenth Day of July, 2019

Andrei Iancu
*Director of the United States Patent and Trademark Office*